(12) United States Patent
Vo

(10) Patent No.: US 10,618,828 B2
(45) Date of Patent: Apr. 14, 2020

(54) MAGNETIC SCALE REDUCING AND INHIBITING SYSTEM

(71) Applicant: AkwaMag, PBC., San Jose, CA (US)

(72) Inventor: Tuyen Long Vo, San Jose, CA (US)

(73) Assignee: AKWAMAG, PBC, San Jose, CA (US)

( * ) Notice: Subject to any disclaimer, the term of this patent is extended or adjusted under 35 U.S.C. 154(b) by 0 days.

(21) Appl. No.: 14/923,093

(22) Filed: Oct. 26, 2015

(65) Prior Publication Data
US 2016/0115049 A1   Apr. 28, 2016

(51) Int. Cl.
*C02F 1/48*   (2006.01)
(52) U.S. Cl.
CPC .......... *C02F 1/482* (2013.01); *C02F 2209/40* (2013.01); *C02F 2303/22* (2013.01)
(58) Field of Classification Search
CPC ... B03C 1/28; B03C 1/288; C02F 1/48; C02F 1/481; C02F 1/482; C02F 2209/40; C02F 2303/22
See application file for complete search history.

(56) References Cited

U.S. PATENT DOCUMENTS

| | | | | |
|---|---|---|---|---|
| 4,146,479 A | * | 3/1979 | Brown | C02F 1/481 210/222 |
| 5,178,757 A | * | 1/1993 | Corney | C02F 1/481 210/222 |
| 5,673,674 A | * | 10/1997 | Monteiro Vieira | C02F 1/482 123/538 |
| 5,681,454 A | * | 10/1997 | Schenk | C02F 1/481 210/132 |
| 5,918,636 A | * | 7/1999 | Mitchell | C02F 1/482 138/177 |
| 2006/0006106 A1 | * | 1/2006 | White | C02F 1/481 210/175 |
| 2010/0084274 A1 | * | 4/2010 | Uemori | C02F 1/482 204/664 |

FOREIGN PATENT DOCUMENTS

DE              29609100 U1 *  8/1996  .............. C02F 1/482

OTHER PUBLICATIONS

English language machine translation of DE 29609100 U1.*

* cited by examiner

*Primary Examiner* — David C Mellon
(74) *Attorney, Agent, or Firm* — Dorsey & Whitney LLP

(57) ABSTRACT

An apparatus for reducing and inhibiting scale formation in water conduits is disclosed. The scale reducing apparatus has at least two stages, each stage containing one or more conduits therein surrounded by magnets. The magnets form a strong, substantially uniform magnetic field in the conduit (s) which is substantially perpendicular to the flow of water therein. Dissolved ions in the water interact with the magnetic field and may as a result be forced into contact with one another to form one or more non-dissolvable solids. The reduction in dissolved ions reduces and/or inhibits the formation of scale in the water supply lines of a structure, thus increasing the life of the conduits, appliances, and other structures where scale may form.

17 Claims, 6 Drawing Sheets

MAGNETIC SCALE REDUCING AND INHIBITING SYSTEM

CROSS REFERENCE TO RELATED APPLICATIONS

This application claims the benefit of priority of U.S. provisional application No. 62/068,647, filed Oct. 25, 2014, and U.S. provisional application No. 62/069,016, filed Oct. 27, 2014, the contents of which are incorporated herein by reference.

TECHNICAL FIELD

The technology described herein relates to reducing the amount of scale, and inhibiting scale formation, in hard water environments. In some embodiments, the technology is related to a magnetic scale reduction device for use in domestic, commercial, or industrial environments in order to reduce the amount of scale buildup resulting from the use and/or presence of hard water.

BACKGROUND

As water filters through the ground to accumulate in wells, aquafers, and/or in municipal water sources, minerals in the ground are absorbed and dissolved in the water. Commonly these minerals include calcium (Ca) and magnesium (Mg), as limestone, chalk, calcite, gypsum, and dolomite, among others, are common ground rock formations. As these minerals dissolve, they form an aqueous solution having water and multivalent cations $Ca^{2+}$ and $Mg^{2+}$, respectively. The presence of these positively charged cations is a measurement of the "hardness" of the water. The harder the water is, the greater the likelihood of the formation of scale on surfaces such as shower doors, sinks, faucets, the interior surface of water conduits such as pipes, heating chambers, evaporative cooling systems, and the like.

Scale forms as a result of the multivalent cations coming into contact with bicarbonates in the water source to form solids which do not readily dissolve in water, such as calcium carbonate ($CaCO_3$), magnesium hydroxide ($Mg(OH)_2$), calcium sulfate ($CaSO_4$). Over time, these solids accumulate on pipe interiors and restrict flow, structural surfaces, heating or evaporative chamber walls, and the like. In domestic settings, the scale may be unsightly requiring harsh chemicals to clean. The presence of scale may also cause some surfaces to galvanically corrode, causing weaknesses and potential failure points in pipes or on surfaces. Further, in heating chambers, scale buildup can cause additional energy to be applied to heat the water, and may result in other negative side-effects which shorten the life of the unit.

Prior solutions to inhibiting, reducing, or removing scale involve the use of disposable supplies, such as salts or ion exchange beds, which presents a cost to the user for the entire life of the device, and can also introduce unwanted additional chemicals into the water line and ultimately to the environment. Accordingly, there is a need for a device which can reduce and inhibit the formation of scale in hard water environments which doesn't continuously cost a user to use and doesn't introduce undesirable or extra chemicals into the water.

The information included in this Background section of the specification, including any references cited herein and any description or discussion thereof, is included for technical reference purposes only and is not to be regarded subject matter by which the subject matter disclosed herein, as it may or may not be defined in the claims, is to be bound.

SUMMARY

In one example of the present disclosure, an apparatus for inhibiting scale formation is disclosed, comprising a water inlet configured for connection to a water source and being in fluid communication with a first end of at least one water treatment conduit. The apparatus may comprise a water outlet configured for connection to a water supply for a structure and being in fluid communication with a second end of the at least one water treatment conduit, and a treatment assembly comprising the at least one water treatment conduit and at least one pair of magnets. In one example, the diameter of the at least one water treatment conduit is smaller than the diameter of the water inlet such that a flow rate of water in the water treatment conduit is greater than a flow rate of water in the water inlet, and the at least one pair of magnets are disposed symmetrically on opposite sides of the at least one water treatment conduit.

In another example of the present disclosure, an apparatus for reducing scale formation is disclosed, comprising a water supply line configured for connection to a water source and in fluid communication with a first end of a water treatment assembly, the water treatment assembly comprising a first treatment stage and at least one auxiliary treatment stage; and a water outlet in fluid communication with a second end of the water treatment assembly and configured for connection to a water input line to a structure. The apparatus may be configured such that the first treatment stage comprises at least one pair of magnets and at least one first water treatment conduit, and wherein the at least one auxiliary treatment stage comprises at least one pair of magnets, at least one auxiliary water treatment conduit, and a water flow control member. In this example, each pair of magnets may comprises two magnets disposed symmetrically on opposite sides of each water treatment conduit. In this example, the first treatment stage of the apparatus does not have a water flow control member.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present disclosure as defined in the claims is provided in the following written description of various embodiments and illustrated in the accompanying drawings.

DETAILED DESCRIPTION

General Overview

The present disclosure is generally directed to a scale reducing and inhibiting apparatus for reducing the formation of scale in water, on surfaces that come into contact with scaled water and other fluid conduit lines. In some examples, the present apparatus is direct to reducing formation of scale resulting from hard water, or water having dissolved ions such as Calcium or Magnesium, or the like. Scale formation in water conduits, such as water pipes, combustion or heating chambers, and other structures configured for processing water, can reduce the life of the water conduit significantly. The formation of scale in such conduits can cause corrosion due to galvanic reactions between materials forming the conduits and the dissolved ions. Further, the formation of scale may reduce water flow rates as scale builds up and reduces the diameter of the conduit. In other examples, in combustion or heating chambers such as a hot water heater or boilers, scale formation can require more energy to reach the same water temperature, thus increasing costs and potentially damaging the equipment.

The apparatus of the present disclosure reduces or inhibits scale formation by use of a strong, substantially uniform magnetic field formed perpendicular to water flow within the water conduits of the apparatus. In some examples, as discussed in more detail below, magnetic members are provided symmetrically opposite one another with their north and south poles facing each other, respectively. When charged particles dissolved in the water flowing through the water conduits of the scale reducing apparatus pass through the magnetic field, they are caused to move in a direction opposite their ionic charge. In the case of two ions that are oppositely charged, such as a $Mg^{2+}$ ion and a carbonate ion, $(CO_3)^{-1}$, those ions will be caused to move toward each other in the magnetic field. This increases the likelihood that the charged particles, or ions, come into contact with each other and combine into a non-dissolvable solid. Once combined, the non-dissolvable solid passes through the conduit without forming scale within the water conduit. In some examples, the dissolved particles may be calcium ($Ca^{2+}$) or magnesium ($Mg^{2+}$) ions as well as carbonate $(CO_3)^{-1}$ and hydroxide $(OH)^{-1}$, which respectively may form calcium carbonate ($CaCO_3$) and magnesium hydroxide ($Mg(OH)_2$) upon coming into contact with each other. It is noted that the term "contact" includes direct contact between the ions, however it may not require direct contact and instead may refer to the respective ions coming into close enough proximity such that they attract each other to form the non-dissolvable solid.

Figure 1:
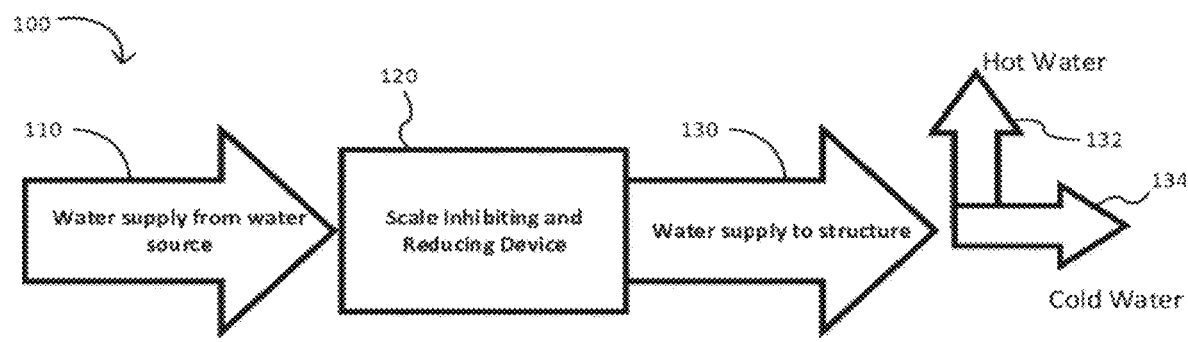
FIG. 1 depicts a functional view of the scale reducing system according to an example of present disclosure.

Turning now to the figures, the scale reducing and inhibiting apparatus will be described in more detail. With reference to FIG. 1, a functional view of the scale reducing system 100 is shown. In particular, a water supply from a water source 110 such as a public utility, water well, or the like is placed in fluid communication with the scale reducing apparatus 120. The water flows through the scale reducing apparatus 120, where scale is removed. The scale reducing apparatus 120 is also in fluid communication with a water supply to a structure 130. As can be seen in FIG. 1, the water supply 130 may be the primary water supply to the structure, which may have hot water 132 and cold water conduits 134 therein. Accordingly, all of the water supplied to the structure is treated by the scale reducing apparatus 100.

Figure 2A:
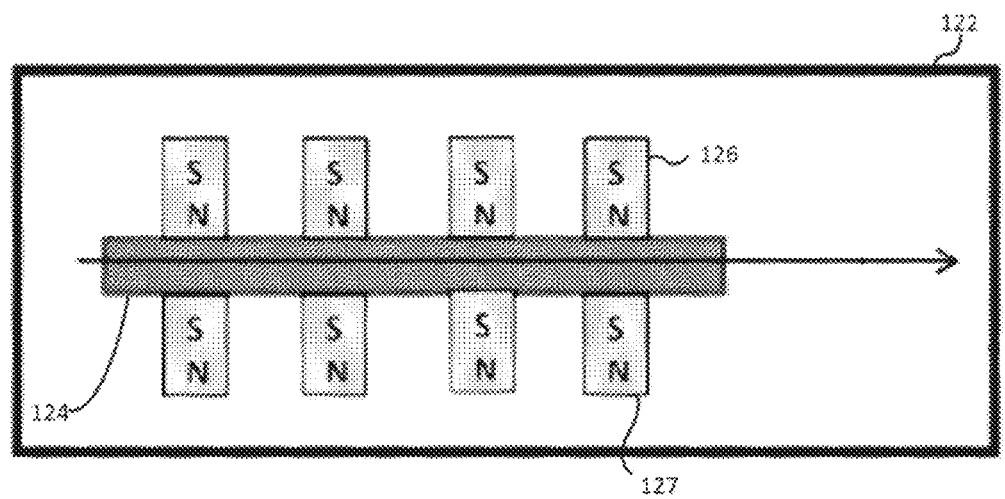
FIGS. 2A-2C depict partial cross-sections of a portion of the scale reducing apparatus of the system in FIG. 1.
Figure 2B:
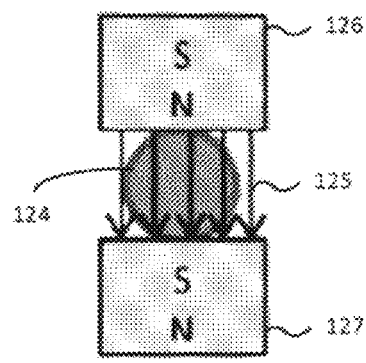

FIGS. 2A and 2B depict two views of an exemplary stage 122 of the scale reducing apparatus 120. The scale reducing apparatus 120 may have more than one stage 122. As shown in FIG. 2A, each stage of the scale reducing apparatus may include a plurality of first magnetic members 126 and second magnetic members 127. The magnetic members 126, 127 are disposed around the water conduit 124 along a length thereof. Magnetic members 126, 127 are disposed symmetrically opposite the water conduit 124 such that an attractive magnetic force is formed in the conduit 124. That is, the first magnetic members 126 may have an orientation where the north pole is facing the south pole of the second magnetic members 127. That is, the attractive poles of the magnetic members 126, 127 are configured to face each other. This sets up a generally uniform magnetic field 125 between the respective magnetic members, as seen in FIG. 2B. It is noted that while the magnetic members 126, 127 are depicted as being oriented in the same direction, the present disclosure is not limited to this and the magnetic members 126, 127 forming magnetic pairs may be alternatively and oppositely positioned so long as their respective attractive poles facing each other.

Magnetic members 126, 127 are preferably strong, permanent magnets such as neodymium rare-earth magnets. In some examples, certain grades of neodymium magnets may be necessary to ensure a strong, substantially uniform magnetic field in different operating temperatures. For example, if the scale reducing apparatus 120 is being used in an environment without extreme temperatures, neodymium grades of N35-N52 may be chosen. In an example where the apparatus 120 is used in high temperature settings, appropriate neodymium grades such as 30H-35H or the like may be used. However, the present disclosure is not limited to these, and any type and grade of magnet capable of setting up a strong, uniform field in the water conduit 124 may be used. In some examples, electromagnets or ferrite magnets may also be used.

Figure 2C:
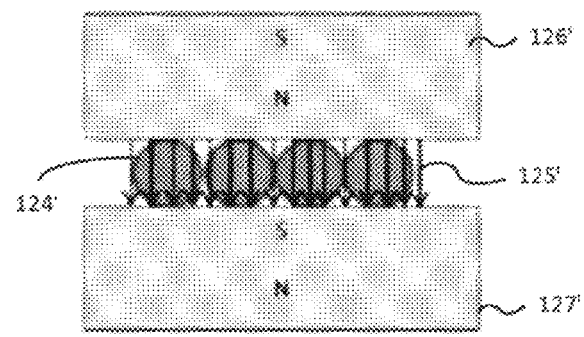

Turning briefly to FIG. 2C, a cross-section of alternate example of stage 122 of the scale reducing apparatus 120 is shown. In this example, multiple water conduits 124' are provided in each stage 122 of the scale reducing apparatus 120. Larger magnetic members 126' and 127' are provided to ensure that a magnetic field 125' is formed within each water conduits 124'. By providing multiple water conduits 124', the overall flow rate of each stage 122 can be increased while still effectively reducing the amount of scale-forming ions in the water.

With reference to FIGS. 3A-3D, an exemplary mechanism for inhibiting and reducing scale in the scale reducing apparatus 120 is shown. In particular, water conduit 124, 124' has water 310 flowing there through in a direction indicated by arrow 355. Likewise, dissolved ions 320, 330 are flowing in substantially the same direction as indicated by arrow 340. As discussed above, first magnetic member 126 is disposed symmetrically opposite the second magnetic member 127. For simplicity, only one magnetic member pair 126, 127 is depicted, though several may be provided as shown in FIG. 2A. The water 310 may contain therein dissolved ions which contribute to the formation of scale. In the example shown, calcium ions ($Ca^{2+}$) 330 and carbonate ions ($HCO_{3-}$) 320 are dissolved in the water 310 within the conduit 124, 124'. It is noted that calcium and carbonate ions are merely used as examples, and other dissolved ions may be present such as magnesium and hydroxide ions or the like.

Figure 3A:
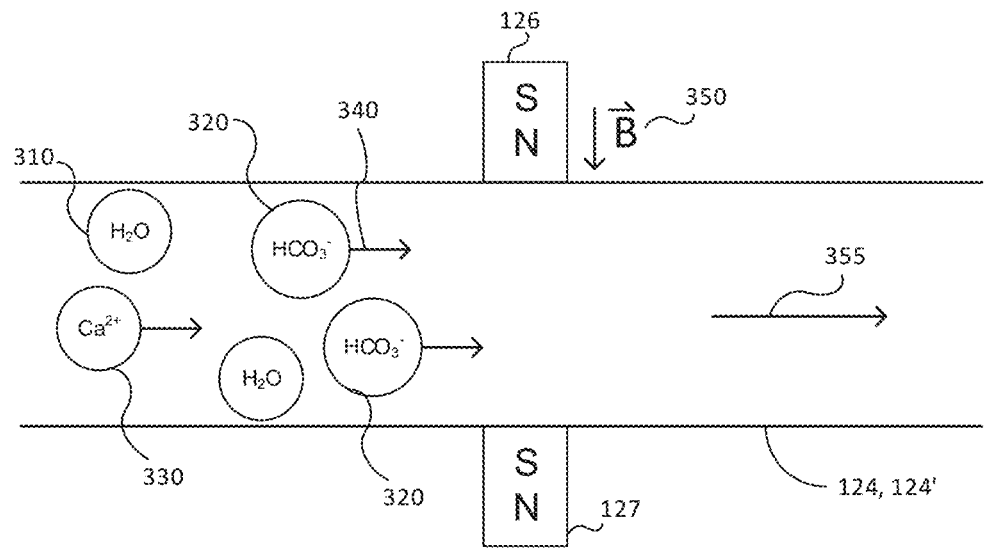
FIGS. 3A-3D depict a functional mechanism for reducing scale in the water flow of a portion of the system of FIG. 1.
Figure 3B:
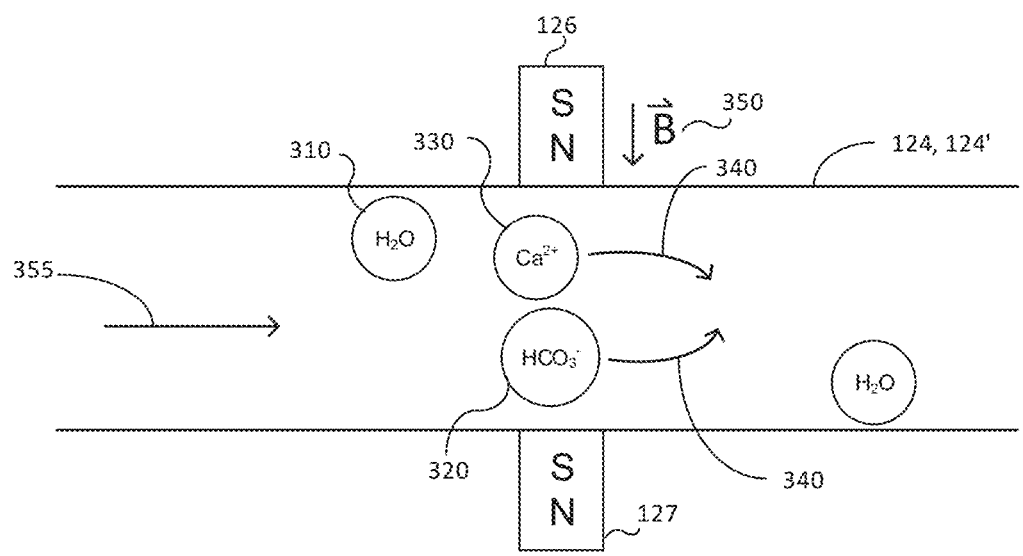
Figure 3C:
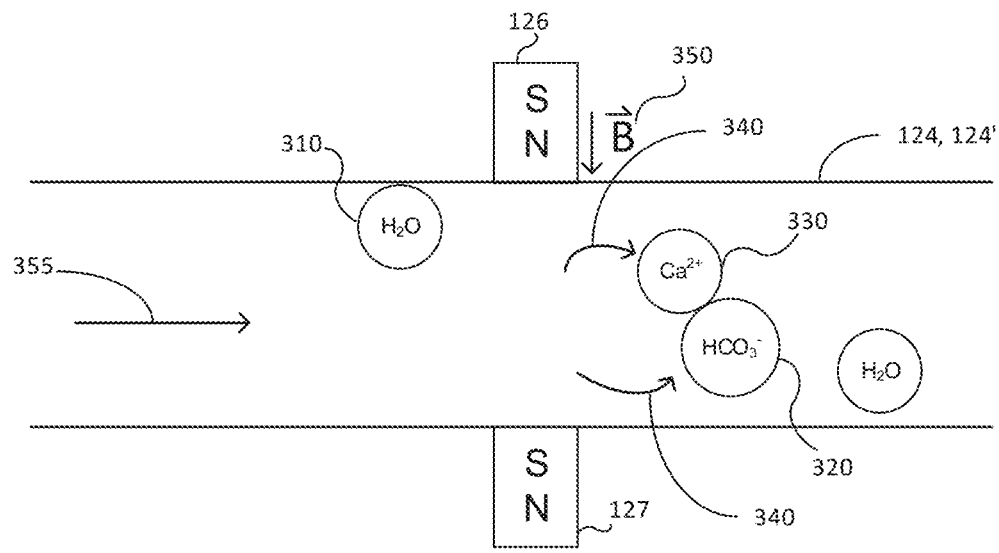

FIG. 3B shows the condition of the water conduit 124, 124' after the water and dissolved ions have flowed to a position between the magnet pair 126, 127. As result of the magnetic field 350 formed by the magnet pair 126, 127, the charged ions are affected by the magnetic field 350 and are caused to flow in substantially opposite directions within the flow, as shown by arrows 340. In particular, the negatively charged hydroxide ions 320 may be attracted "upward" toward the first magnetic member 126, while the positively charged calcium ions 330 may be attracted "downward" toward the second magnetic member 127. As shown in FIG. 3C, this increases the likelihood that the ions 320, 330 come into contact with one another. As discussed above, the term "contact" may include the ions coming into close enough proximity such that they ionically bond and form a non-dissolvable solid.

Figure 3D:
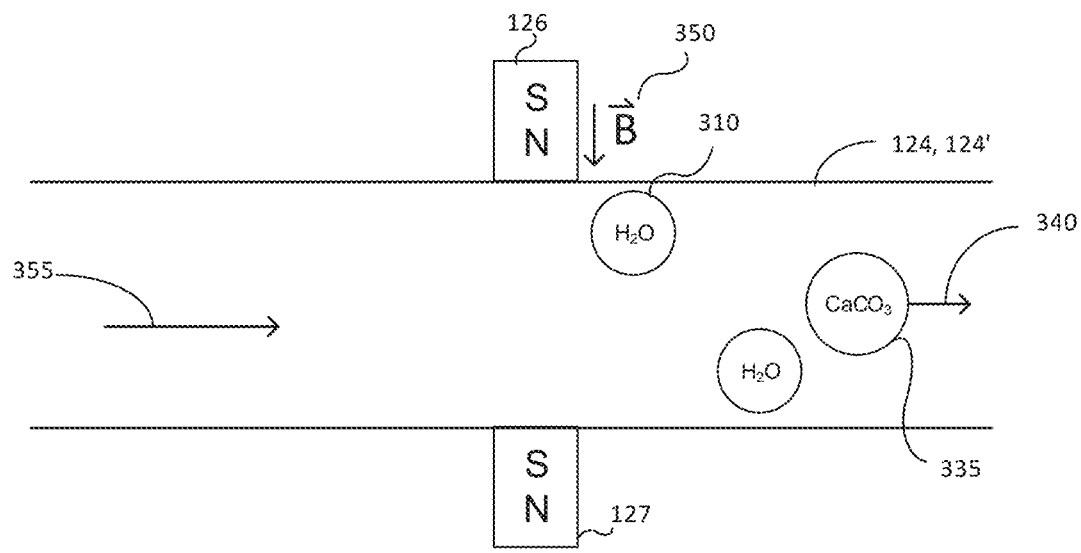

Turning to FIG. 3D, the water and ions have flowed past the magnet pair 126, 127 and after contacting each other have formed a non-dissolvable solid. In this example, the non-dissolvable solid is calcium carbonate ($CaCO_3$) 335. Accordingly, ions which may contribute to scale formation in water conduits are caused to form a non-dissolvable solid within the water flow, which inhibits and reduces the amount of scale formation in water conduits in the water supply to the structure 130.

Figure 4:
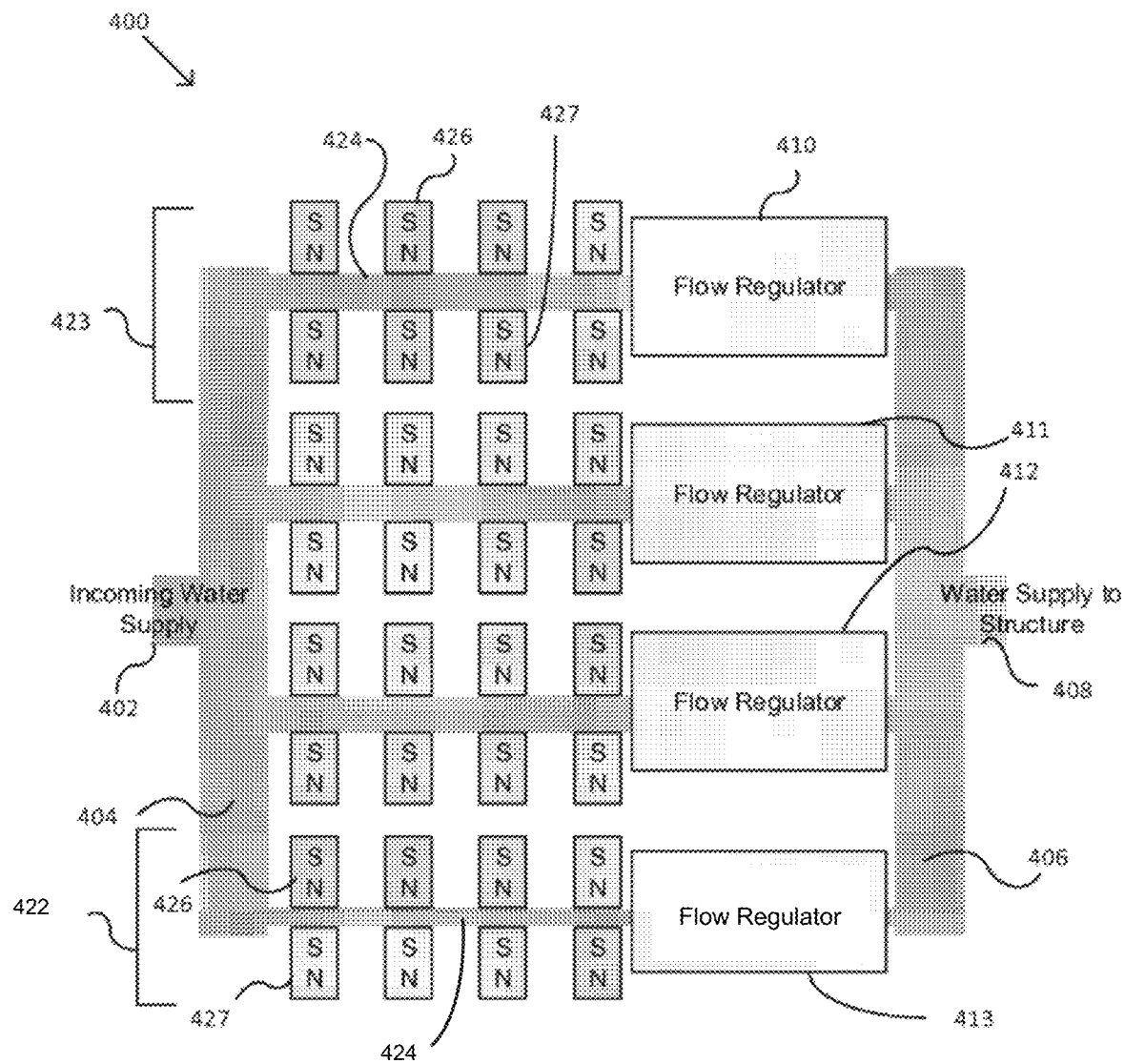
FIG. 4 depicts an example of a multi-stage scale reducing apparatus for use in the system of FIG. 1.

FIG. 4 depicts an example of a complete scale reducing apparatus 400 having multiple stages 422, 423. The scale reducing apparatus 400 may be similar to the scale reducing apparatus 120 of FIG. 1, and each stage 422, 423 may be similar to the stage 122 in FIGS. 2A-2C. An incoming water supply 402, such as a water utility, water well, or the like, is placed in fluid communication with the scale reducing apparatus 400. A primary conduit 404 directs the water or other fluid to the multiple stages 422 of the apparatus 400. The scale reducing apparatus may have a first stage 422 and at least one auxiliary stage 423. Each stage may have magnetic members 426, 427 forming magnetic pairs, respectively, disposed along the flow direction or along the length of the water conduit 424. In a particular example, the magnetic members 426, 427 may be have dimensions of approximately 2"×2"×½" inches, and the water conduit 424 of the first stage 422 may have an outer diameter of ¼" and an inner diameter of 1/16". In some examples, the conduits 424 are made polypropylene or polyethylene. However, the present disclosure is not limited to this and the material for the conduits 424 may be metallic, ceramic, or any other suitable material for containing water under pressure.

The diameters of water conduits 424 within stages 422, 423 may vary in order to allow different flow rates through the various stages 422, 423. However, it is noted that water conduit diameters are each smaller than a diameter of the primary conduit 404 and incoming water supply 402 conduit such that water flows more rapidly in conduits 424. This increased flow rate may improve the interaction of the magnetic field 350 with the charged particles 320, 330 shown in FIGS. 3A-3D by increasing the velocity v of the dissolved ions. The force exerted by the magnetic field 350 on the dissolved ions may be expressed as $F=q(v \times B)$, where v is the velocity of the ions, corresponding to the flow rate of water in the conduit, q is the charge of the particle, and B is the magnetic field strength. In some examples, the first stage 422 may have a conduit 424 with a diameter smaller than the primary conduit 404 and the diameters of conduits 424 of the auxiliary stages 423. That is, the water conduit 424 diameters may vary between stages to accommodate variable water flow rates within the respective stages 422, 423.

As depicted in FIG. 4, each stage 422, 423 may have a flow regulator or flow control member 413, 410 provided in line with the water conduits 424, respectively. In some examples, the flow regulators 413, 410 may be valves such as check valves, or the like. However, the present disclosure is not limited to this and the flow regulators may be any device capable of restricting or stopping water flow therethrough. The flow regulator 413 of the first stage 422 may be chosen to ensure that, at low flow rates, water may still flow through the scale reducing apparatus 400. For example, when water supply 408 to the structure has a low water flow rate, or when the pressure in the secondary conduit 406 is slightly reduced, water may still flow through the first stage 422 at a high flow rate or velocity and accordingly function to reduce the scale-forming ions contained therein. In some examples, the diameter of the conduit 424 of the first stage 422 may be sufficiently small that a flow regulator 413 may not be provided.

Plural auxiliary stages 423 may be provided with flow regulators 410 which allow water flow therethrough under certain conditions. In some examples, flow regulators 410 allow water flow in response to a drop in pressure and/or increase in flow rate in the secondary conduit 406. This situation may correspond to increased water consumption in the water supply 408 to the structure. That is, when more demand for water is present in the secondary conduit 406, the flow regulators 410 may allow water to flow through all or a subset of auxiliary stages 423. Similarly, auxiliary stages 423 may be activated (that is, the flow regulator 410 allows water to flow therethrough into secondary conduit 406) based upon the first stage 422 reaching the maximum flow rate or flow capacity of the first stage 422, and subsequent auxiliary stages 423 may be activated when the flow capacity of the other auxiliary stages 423 has been exceeded.

In some examples, the flow regulators 410 are the same. However, in some embodiments the flow regulators 410 may function to allow water flow in a sequential manner in response to predefined thresholds. That is, in one auxiliary stage 423 such as the one directly above the first stage 422 in FIG. 4, the flow regulator 410 may allow water to flow in the conduit 424 in response to a drop in pressure or an increase in flow rate in the secondary conduit 406. A predetermined threshold may be selected such that a pressure difference of 1 psi-5 psi in the secondary conduit activates a flow regulator 410 of an auxiliary stage 423 and allows water to flow through the auxiliary stage 423. However, the activating threshold for the flow regulator 410 may be any predetermined threshold and may be selected based on the intended use of the scale reducing device 400. Furthermore, activating thresholds for the additional flow regulators 410 in the remaining auxiliary stages 423 may vary. In some examples, the thresholds may vary by a predetermined amount, such as a decrease of 5 psi in the secondary conduit 406, or may be varying thresholds. Preferably, the difference in thresholds for flow regulators 410 in the auxiliary stages 423 may be selected such that a user does not notice or recognize the drop in pressure before said auxiliary stage 423 is activated.

Accordingly, when increasing demand is placed on the secondary conduit 406 by the water supply 408 to the structure, the first stage 422 and auxiliary stages 423 may sequentially activate to increase the overall flow rate of the water through the respective stages 422, 423 into the secondary conduit 406. This ensures that as more water is consumed within the structure, the scale reducing apparatus 400 responds to increase the flow rate and amount of water flowing therethrough to maintain a desirable water pressure in the secondary conduit 406, and as a result the water supply 408 to the structure. It is noted that though three auxiliary stages 423 are depicted, the present disclosure is not limited to this and more or fewer auxiliary stages 423 may be provided as needed. As shown in FIG. 4, the scale reducing apparatus 400 may be operate as a multi-stage, multi-pass scale reducing device, which each stage being one "pass."

Figure 5:
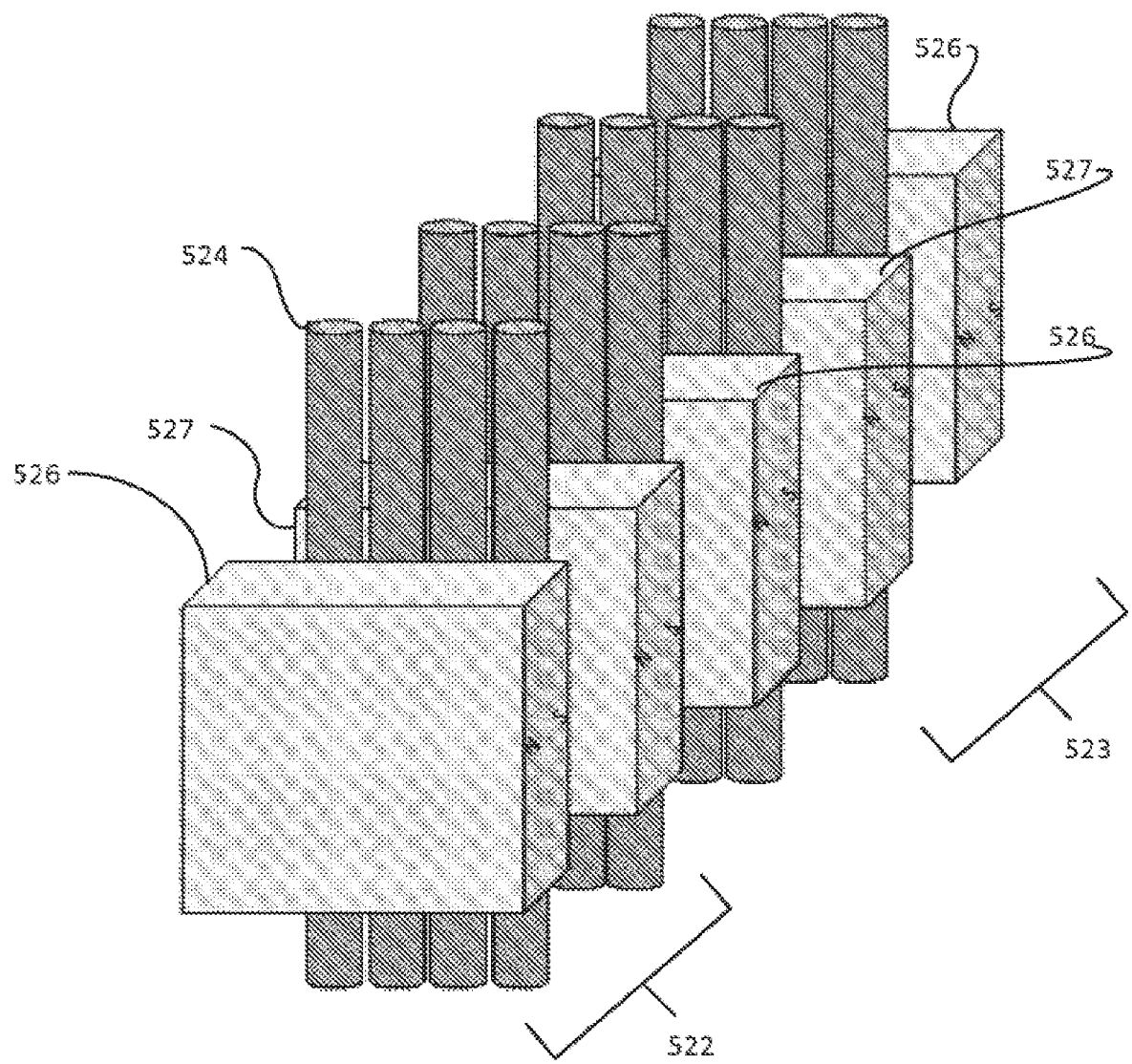
FIG. 5 is a partial perspective view of a portion of an example of the scale reducing apparatus of FIG. 4.

FIG. 5 is a partial perspective views of the first stage 522 and auxiliary stages 523. The first stage 522 and auxiliary stages 523 may correspond to the first stage 422 and auxiliary stages 423. As seen in FIG. 5, each stage may have plural water conduits 524 provided between magnet pairs 526, 527. In some examples, the magnetic members 526 may correspond to first magnetic members 126, 426 of FIGS. 2A and 4, respectively, and magnetic members 527 may correspond to second magnetic members 127, 427 in FIGS. 2A and 4, respectively. By providing plural water conduits 524 within each stage, an overall increase in water flow per stage may be achieved while allowing for the diameter of the conduits 524 to be small enough for the magnetic field to effectively reduce the amount of scale-forming dissolved ions within the water (as discussed above with respect to FIGS. 3A-3D).

Figure 6:
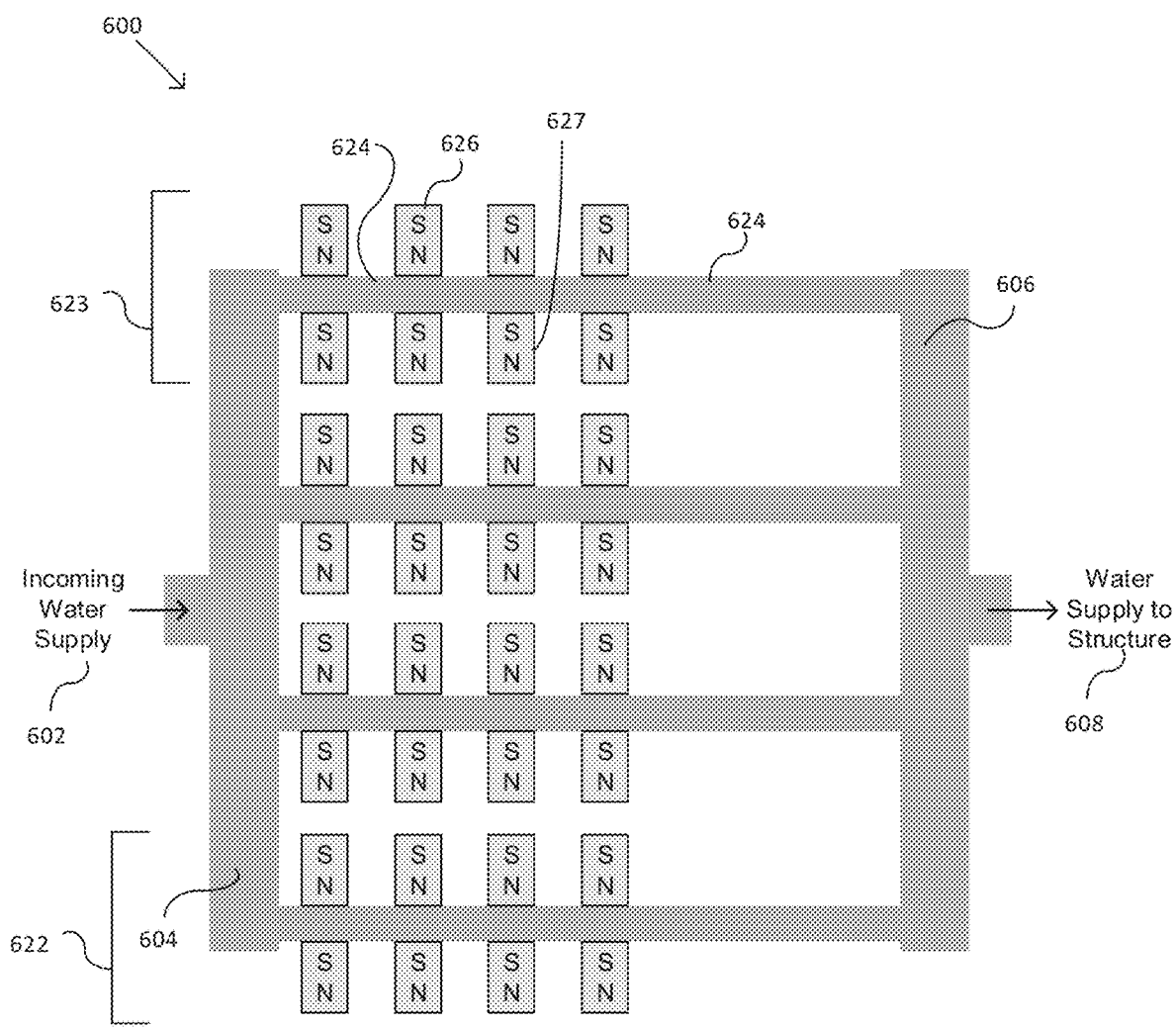
FIG. 6 depicts another example of a multi-stage scale reducing apparatus for use in the system of FIG. 1.

FIG. 6 provides another example of a complete scale reducing apparatus 600 having multiple stages 622, 623. The scale reducing apparatus 600 may be substantially similar to the scale reducing apparatus 400 of FIG. 4, and each stage 622, 623 may be similar to the stage 122 in FIGS. 2A-2C. An incoming water supply 602, such as a water utility, water well, or the like, is placed in fluid communication with the scale reducing apparatus 600. A primary conduit 604 directs the water or other fluid to the multiple stages 622, 623 of the apparatus 600. The scale reducing apparatus may have a first stage 622 and at least one auxiliary stage 623. Each stage may have magnetic members 626, 627 forming magnetic pairs, respectively, disposed along the flow direction or along the length of the water conduit 624.

As discussed above with respect to the apparatus of FIG. 4, the diameters of water conduits 624 within stages 622, 623 may vary in order to allow different flow rates through the various stages 622, 623. However, it is noted that water conduit diameters are each smaller than a diameter of the primary conduit 604 such that water flows more rapidly in conduits 624. This increased flow rate may improve the interaction of the magnetic field 350 with the charged particles 320, 330 shown in FIGS. 3A-3D. In some examples, the first stage 622 may have a conduit 624 with a diameter smaller than the primary conduit 604 and the diameters of conduits 624 of the auxiliary stages 623. That is, the water conduit 624 diameters may vary between stages to accommodate variable water flow rates within the respective stages 622, 623.

As depicted in FIG. 6, the first stage 622 and auxiliary stages 623 may not be provided with flow regulators. In this example, the demand for water in the secondary conduit 606 may be such that all stages 622, 623 will be needed, and thus sequentially-activated flow regulators may not be necessary. For example, in an industrial structure such as a cooling tower, boiler room, or the like, the demand for water may be substantially constant. Accordingly, there may be little variation in the pressure and water flow rate in the secondary conduit 606. It is noted that though three auxiliary stages 623 are depicted, the present disclosure is not limited to this and more or fewer auxiliary stages 623 may be provided.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present disclosure, and do not create limitations, particularly as to the position, orientation, or use of the subject matter disclosed herein. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto may vary.

The above specification, examples and data provide a complete description of the structure and use of exemplary embodiments defined in the claims. Although various embodiments of the claimed subject matter have been described above with a certain degree of particularity, or with reference to one or more individual embodiments, those skilled in the art could make numerous alterations to the disclosed embodiments without departing from the spirit or scope of the present disclosure. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the disclosed subject matter as defined in the following claims.

What is claimed is:

1. An apparatus for inhibiting scale formation, comprising:
    a water inlet configured for connection to a water source and being in fluid communication with a first end of each of at least a first and a second water treatment conduit;
    a water outlet configured for connection to a water supply for a structure and being in fluid communication with a second end of each of at least the first and the second water treatment conduit; and
    at least one treatment assembly comprising at least one of the first and the second water treatment conduit and a plurality of pairs of magnets;
    wherein the inner diameter of each of at least the first and the second water treatment conduit is smaller than the inner diameter of the water inlet such that a flow rate of water in the water treatment conduits is greater than a flow rate of water in the water inlet;
    wherein the inner diameter of the first water treatment conduit is different than the inner diameter of the second water treatment conduit;
    wherein at least a first pair of the plurality of pairs of magnets is disposed symmetrically on opposite sides of one of the first and the second water treatment conduit; and
    wherein a member of a second pair of the plurality of pairs of magnets is disposed back-to-back with a member of the first pair of magnets and between the one of the first and the second water treatment conduit and an other of the first and the second water treatment conduit.

2. The apparatus of claim 1, wherein the treatment assembly further comprises at least two water treatment stages, each water treatment stage comprising a single water treatment conduit and at least one pair of magnets.

3. The apparatus of claim 2, wherein each water treatment stage comprises a plurality of pairs of magnets disposed along the length of each water treatment conduit.

4. The apparatus of claim 3, wherein the pairs of magnets are arranged along each water treatment conduit so as to form a substantially uniform magnetic field perpendicular to the length of each water treatment conduit.

5. The apparatus of claim 2, wherein the flow rate of water in the at least two water treatment stages is different.

6. The apparatus of claim 1, wherein the water source is selected from a water utility source and a water well.

7. The apparatus of claim 1, wherein the water source provides water having dissolved ions selected from magnesium ions, calcium ions and a combination of the two.

8. An apparatus for reducing scale formation, comprising:
a water supply line configured for connection to a water source and in fluid communication with a first end of a water treatment assembly, the water treatment assembly comprising a first treatment stage and at least one auxiliary treatment stage; and
a water outlet in fluid communication with a second end of the water treatment assembly and configured for connection to a water input line to a structure;
wherein the first treatment stage comprises at least one pair of magnets and at least one first water treatment conduit, and wherein the at least one auxiliary treatment stage comprises at least one pair of magnets, a plurality of auxiliary water treatment conduits, and a water flow control valve;
wherein:
each auxiliary water treatment conduit is arranged for parallel water flow with each other auxiliary water treatment conduit;
each pair of magnets comprises two magnets disposed symmetrically on opposite sides of each first and auxiliary water treatment conduit;
the first treatment stage does not have a water flow control valve;
each first water treatment conduit has a first inner diameter;
each auxiliary water treatment conduit has a second inner diameter;
the first inner diameter and second inner diameter are different; and
the first inner diameter and the second inner diameter are both smaller than the inner diameter of the water supply line.

9. The apparatus of claim 8, wherein the first treatment stage comprises more than one first water treatment conduit.

10. The apparatus of claim 8, wherein the first treatment stage and the at least one auxiliary treatment stage each comprise a plurality of pairs of magnets provided along a flow direction of water in the first treatment stage and the at least one auxiliary treatment stages, respectively.

11. The apparatus of claim 10, wherein the pairs of magnets are arranged along each first and auxiliary water treatment conduit so as to form a substantially uniform magnetic field perpendicular to the length of each first and auxiliary water treatment conduit.

12. The apparatus of claim 11, wherein:
the water source provides water having dissolved ions; and
the dissolved ions contact each other upon passing through the magnetic field.

13. The apparatus of claim 8, wherein the water treatment assembly comprises a plurality of auxiliary treatment stages, each auxiliary treatment stage having a water flow control valve; and
wherein each water flow control valve is configured to allow water to flow when a predetermined threshold has been reached, the predetermined threshold being different for each auxiliary treatment stage.

14. The apparatus of claim 13, wherein the predetermined threshold is based on a water pressure or a water flow rate in the water input line.

15. The apparatus of claim 8, wherein the water flow control valve of the at least one auxiliary treatment stage allows water to flow through the at least one auxiliary treatment stage in response to a change in pressure or water flow in the water input line.

16. The apparatus of claim 8, wherein the water source is selected from a water utility source and a water well;
the water supply line is a primary water supply for the structure; and
the water source provides water having dissolved ions selected from magnesium ions and calcium ions.

17. The apparatus of claim 8, wherein the water flow control valve opens in response to a maximum flow rate being reached in the first treatment stage.

* * * * *